March 6, 1951 R. A. NESS 2,544,276
DENTAL FLOSS HOLDER
Filed March 5, 1949
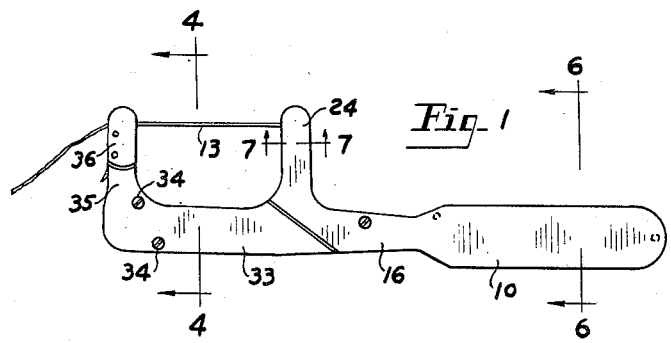
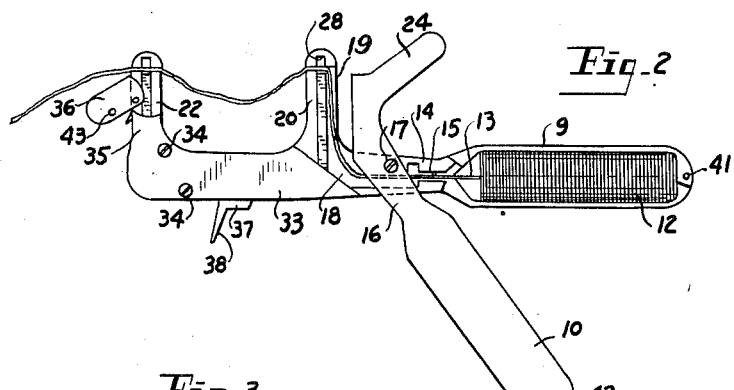
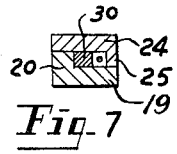
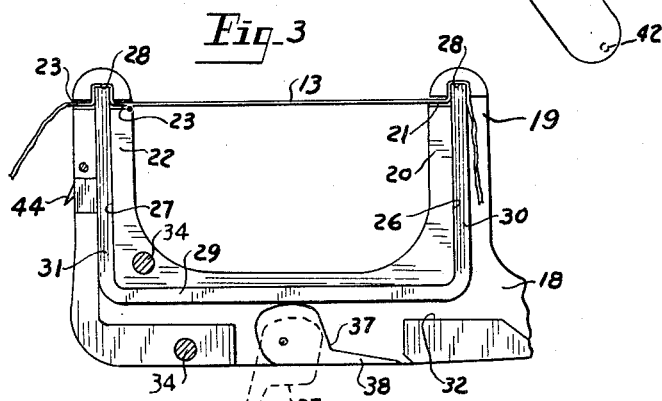
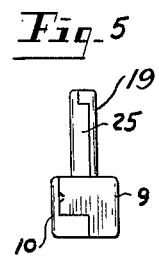
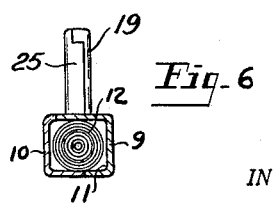
INVENTOR.
ROBERT A. NESS.
BY
Thos. J. Donnelly
ATTORNEY.

UNITED STATES PATENT OFFICE 2,544,276

DENTAL FLOSS HOLDER

Robert A. Ness, Royal Oak, Mich.

Application March 5, 1949, Serial No. 79,759

8 Claims. (Cl. 132—92)

My invention relates to a new and useful improvement in a dental floss holder, so constructed and arranged that a supply of dental floss may be contained within the holder and fed off individually in a strand as needed.

It is an object of the invention to provide a dental floss holder of this class which will be simple in structure, economical of manufacture, durable, compact, light, attractive in appearance, and highly efficient in use. Another object of the invention is the provision of a pair of separated holding members which will hold opposite ends of a portion of the strand of dental floss and which are associated with a mechanism whereby the portion held between the holders may be drawn to a taut condition and retained in this condition, while at the same time these members may be easily and quickly moved for the feeding of an additional quantity of the dental floss into position between the holding members.

Another object of the invention is the provision in a dental floss holder of this class of grooves or channels for receiving a strand of dental floss and which may be exposed when desired for the threading of the dental floss through these grooves or channels and then covered to prevent dislodgement of the dental floss from the grooves or channels.

Other objects will appear hereinafter.

In the drawings I have shown the preferred embodiment, and it is understood that various modifications and changes may be made in the detail of structure illustrated without departing from the invention.

Forming a part of this specification are drawings in which:

Fig. 1 is a side elevational view of the invention, showing the invention ready for use;

Fig. 2 is a side elevational view of the invention with the cover members swung to uncovering position;

Fig. 3 is an enlarged fragmentary side elevational view of one end of the invention with the cover plates removed;

Fig. 4 is a sectional view, slightly enlarged, taken on line 4—4 of Fig. 1;

Fig. 5 is an end elevational view with the invention in the position shown in Fig. 1;

Fig. 6 is a sectional view taken on line 6—6 of Fig. 1;

Fig. 7 is a slightly enlarged sectional view taken on line 7—7 of Fig. 1.

As shown in the drawings, the invention comprises a handle-forming housing embodying the sections 9 and 10, adapted to provide a compartment 11, in which is positioned a roll 12 of dental floss, from which it may be led off by a single strand 13. The housing section 9 has a neck 14 projecting outwardly therefrom and provided with a passage 15, through which the strand 13 may be drawn. Extending outwardly from the housing-forming section 10 is the neck or arm 16, which is pivotally connected by means of the screw 17 to the plate 18 which forms a part of the neck 14. Projecting upwardly from one side of the plate 18 is a holding finger 19 provided at one side with the flange 20, through which is formed the passage 21, through which the strand 13 is threaded, as clearly appears in Fig. 3. Spaced from and parallel to this holding finger 19 is a holding finger 22 having a passage 23 formed therethrough at one end. Projecting upwardly from the portion 16 is a cover plate 24, which is adapted to cover one face of the finger 19 and which is provided at one edge with a flange 25. This flange 25 is normally in spaced relation to the flange 20 so as to provide a channel 26 spaced from and parallel to the channel 27. Slidable in the channel 26 is one leg 30 of a U-shaped member, the other leg 31 of which is slidably mounted in the channel 27. The bight 29 of this U-shaped member engages in the space 32 which lies between the plate 18 and the cover plate 33 which is fastened by means of the screws 34. This cover plate 33 has the upper extension 35, which serves to partially cover the face of the finger 22, the remaining portion being covered by the cover plate 36, which is pivotally mounted on the finger 22.

A cam plate 37 is provided with a finger 38 extending outwardly therefrom and is provided on its opposite sides with bosses 40, which seat in the recesses 39 formed in the plates 18 and 33.

Formed in the housing-forming section 10 is a recess 41 in which is adapted to seat the boss 42 carried on the inner face of the section 10 so as to normally resist displacement of these parts. Likewise, the swingable plate 36 is provided with a boss 43 seating in a recess formed in the finger 22, so that when these parts are in closing or covering position, they normally resist the swinging movement of that position.

In use, the roll 12 of dental floss is placed within the housing while the parts are in the position shown in Fig. 2, and the strand 13 is threaded through the passage 15 and through the passages 21 and 23. The housing-forming section 10 is then swung into position shown in Fig. 1, and when swung into this position, the flange 25 will press the strand against the side face of the leg 30. The operator would then draw the strand fairly tight, and when drawn tight the cam plate 37 would be rocked from the dotted line position shown in Fig. 3 to the full line position shown in Fig. 3. In this movement, the U-shaped member would move upwardly and the ends of the legs 30 would move into the pockets 28 formed in the upper ends of the fingers 20 and 22, forcing the strand into these pockets and stretching the portion between the fingers into very taut position. When it is desired to use an additional portion of the dental floss, the cam would be swung downwardly to the dotted line position shown in Fig. 3, whereupon, upon pulling on the end of the floss, the U-shaped member would move downwardly and the legs 30 and 31 would release the dental floss from the pockets 28 so that an additional length of the dental floss may be drawn outwardly and then, upon a rocking of the cam 37, secured in taut position between the supporting fingers. The portion of the floss drawn out may then be severed by a cutting blade 44, which is mounted on the face of the finger 22.

In this way I have provided a dental floss holder which is very simple in construction and which, when the roll 12 has been placed in position and the floss set through the various passages, as shown in Fig. 1 and Fig. 2, may be operated with very little inconvenience until the entire roll 12 has been used, as it is not necessary to swing either the member 10 or the member 36 in order to draw out an additional length of the dental floss. The construction is such, also, that it may be made of sufficiently small size for convenient use and may be made sufficiently light so that it may be carried on the person or in a purse.

What I claim as new is:

1. In a dental floss holder of the class described, a pair of spaced apart fingers, each having a passage formed therethrough adjacent one end for the threading of a strand of dental floss therethrough, and each provided at said end with a pocket communicating with said passage; a slidable bar slidable longitudinally of each of said fingers and slidable in one direction across the passage in the finger into said pocket for forcing and binding the strand of dental floss in the pocket; and a rockable cam rockable in one direction for forcing said bars into said pockets.

2. In a dental floss holder of the class described, a pair of spaced apart gripping fingers extending parallel to each other and each provided adjacent one end with a transversely extending passage formed therein for the threading of a strand of dental floss therethrough and each having a pocket communicating with said passage; a U-shaped member having a pair of spaced apart legs, each of said legs being positioned in a channel formed in said fingers and slidable longitudinally thereof and engageable at their ends in said pockets and adapted for moving past said passages and into said pockets for forcing a strand of dental floss into said pockets for retaining the same in taut condition; and a rockable cam engageable with the bight of said U-shaped member for rocking said legs into said pockets, and adapted upon rocking in an opposite direction for releasing said U-shaped member for movement in the opposite direction.

3. In a dental floss holder of the class described, a housing-forming section; a neck projecting outwardly from one end of said section and having a passage formed therethrough, for the reception of a strand of dental floss threaded therethrough; a second housing-forming section adapted to cooperate with said first named section for providing therewith a chamber for reception of a roll of dental floss; a plate on said neck; a finger on said plate projecting outwardly from one edge thereof and having adjacent its end a passage formed therein for the threading of the strand of dental floss therethrough; an arm projecting outwardly from said second section and pivotally mounted on said plate; a finger cover on the end of said arm and adapted, upon the swinging of said arm into one position, for covering said finger and concealing the strand of dental floss.

4. In a dental floss holder of the class described, a housing for reception of a roll of dental floss; a pair of spaced apart fingers, each having a transverse passage formed therethrough adjacent one end for reception of a strand of dental floss threaded therethrough; a cover member for covering said passage on one of said fingers, said cover member being swingably mounted on the finger; and a swingably mounted cover member for the passage in the other of said fingers.

5. In a dental floss holder of the class described, a housing comprising a pair of sections to provide a chamber for the reception of a roll of dental floss, one of said sections being swingable relatively to the other; a pair of spaced apart fingers carried by said handle-forming housing, each having a passage formed therethrough for threading a strand of dental floss therethrough; a locking member for locking the strand between said fingers in fixed position and stretching the same into taut condition; and a rockable cam for moving said locking means into locking position.

6. In a dental floss holder of the class described, a handle-forming housing comprising a pair of sections, one of said sections being swingable relatively to the other; a pair of spaced apart fingers carried by said housing, each of said fingers having a passage formed therethrough for reception of a strand of dental floss; means on one of said sections for covering the passage formed in one of said fingers; a swingable cover on the other of said fingers for covering the passage formed through said finger; means slidable in each of said fingers for engaging a strand of dental floss extending through the passages therein for locking said dental floss against movement; and means for moving said locking means into locking position.

7. In a dental floss holder of the class described, a housing for reception of a roll of dental floss; a pair of spaced apart fingers carried by said housing, each of said fingers having a pocket formed therein adjacent its end, a strand of dental floss led from said housing traversing said pockets; and slidable locking members slidable longitudinally of each of said fingers for forcing the strand of dental floss into said pockets for locking the strand between said fingers in fixed position and stretching the same into taut condition.

8. In a dental floss holder of the class described, a housing for reception of a roll of dental floss; a pair of spaced apart fingers carried by said housing, each of said fingers having a pocket formed therein adjacent its end, a strand of dental floss led from said housing traversing said pockets; and slidable locking members slidable longitudinally of each of said fingers for forcing the strand of dental floss into said pockets for locking the strand between said fingers in fixed position and stretching the same into taut condition; and a manually operable cam for moving said locking members into said pockets.

ROBERT A. NESS.

REFERENCES CITED

The following references are of record in the file of this patent:

UNITED STATES PATENTS

| Number | Name | Date |
|---|---|---|
| 1,257,864 | Hochstadter | Feb. 26, 1918 |
| 1,479,364 | Browne | Jan. 1, 1924 |